United States Patent
Fu et al.

(10) Patent No.: US 7,341,107 B2
(45) Date of Patent: Mar. 11, 2008

(54) VISCOELASTIC ACID

(75) Inventors: Diankui Fu, Missouri City, TX (US); Marieliz Garcia-Lopez De Victoria, Houston, TX (US)

(73) Assignee: Schlumberger Technology Corporation, Sugarland, TX (US)

( * ) Notice: Subject to any disclaimer, the term of this patent is extended or adjusted under 35 U.S.C. 154(b) by 506 days.

(21) Appl. No.: 11/006,004

(22) Filed: Dec. 7, 2004

(65) Prior Publication Data

US 2005/0126786 A1 Jun. 16, 2005

Related U.S. Application Data

(60) Provisional application No. 60/528,884, filed on Dec. 11, 2003.

(51) Int. Cl.
*C09K 8/68* (2006.01)
*C09K 8/74* (2006.01)

(52) U.S. Cl. .................. 166/308.3; 166/300; 166/307; 166/308.2; 507/240; 507/269; 507/277

(58) Field of Classification Search ................ 507/240
See application file for complete search history.

(56) References Cited

U.S. PATENT DOCUMENTS

| 5,258,137 | A | 11/1993 | Bonekamp et al. ......... 252/356 |
| 5,551,516 | A | 9/1996 | Norman et al. ............. 166/308 |
| 5,964,295 | A | 10/1999 | Brown et al. ............... 166/308 |
| 6,232,274 | B1* | 5/2001 | Hughes et al. .............. 507/240 |
| 6,399,546 | B1 | 6/2002 | Chang et al. ............... 507/240 |
| 2002/0004464 | A1* | 1/2002 | Nelson et al. ............. 507/200 |
| 2003/0119680 | A1 | 6/2003 | Chang et al. ............... 507/200 |
| 2004/0138071 | A1* | 7/2004 | Gupta et al. ................ 507/200 |
| 2004/0214725 | A1* | 10/2004 | Moss .......................... 507/129 |

* cited by examiner

*Primary Examiner*—David J. Buttner
(74) *Attorney, Agent, or Firm*—Darla Fonseca; David Cate; Robin Nava (57) ABSTRACT

An acidic viscoelastic surfactant fluid composition is formulated with an acid, for example hydrochloric acid, a cationic surfactant, for example a quaternary amine, and a break-enabling salt, for example $NH_4Cl$. The fluid composition has low viscosity as formulated, undergoes an increase in viscosity as the acid is consumed when it reacts with an acid-reactive material, and returns to approximately the initial viscosity as the last of the acid is consumed. The fluid composition is used as a diverting fluid or as the main treatment fluid in oilfield treatments such as matrix acidizing and acid fracturing.

6 Claims, 10 Drawing Sheets

VISCOELASTIC ACID

CROSS-REFERENCE TO RELATED APPLICATION

This application claims the benefit of U.S. Provisional Patent Application No. 60/528,884, filed on Dec. 11, 2003.

BACKGROUND OF THE INVENTION

This invention relates to an acidic viscoelastic surfactant fluid based on a cationic surfactant. More particularly it relates to such a fluid that has low viscosity as formulated, undergoes an increase in viscosity as the acid is consumed, and returns to approximately the initial viscosity as the last of the acid is consumed. Most particularly it relates to the use of this fluid as a diverting fluid or as the main treatment fluid in oilfield treatments such as matrix acidizing and acid fracturing.

In matrix acidizing treatments of carbonate reservoirs the placement of the stimulation fluid is critical to success. Self-diverting stimulation fluid systems based on viscoelastic surfactants (called "viscoelastic diverting acid" or VDA) have been described; see U.S. Pat. No. 6,399,546 and U.S. patent application Publication No. 2003-0119680, both of which are assigned to the same assignee as the present invention and both of which are hereby incorporated in their entirety. That type of system, based for example on betaine surfactants, will be called the "current" system here. The current VDA system has a low viscosity at low pH (strong acid) and undergoes an in-situ increase in viscosity when the acid is being spent by reaction with calcium carbonate (or other reactive minerals) in the formation. Not to be limited by theory, but the chemical mechanism is believed to be the transformation from spherical or short worm-like surfactant micelles to highly elongated surfactant micelles. The spent fluid is chemically stable up to about 300° F. (149° C.); breaking of the viscous fluid after the treatment (reduction of viscosity rather than chemical destruction of the surfactant) is caused by contact with crude oil or condensates in the reservoir or by dilution by formation water. The use of mutual solvents as pre and/or post flushes has also been applied to assist in the breaking, but it is difficult to achieve effective contact of the VDA with the mutual solvent within a formation.

Although the current VDA has been applied in dry reservoirs and has been found to be successful in some cases, concern remains as to whether spent VDA can be cleaned up effectively with formation fluid or with flushes. It would therefore be highly desirable to have a fluid system that self breaks in the formation, which will greatly simplify job design and execution. It would also be desirable to have an acidic viscous fluid system, such as a VDA fluid system, that is formulated from cationic surfactants as opposed to the zwitterionic surfactants of the current VDA because the salt concentration generated through acid spending is high enough to break viscous fluids made from cationic surfactants, which are more sensitive to high salt concentrations than viscous fluids made from the zwitterionic surfactants used for the current VDA.

SUMMARY OF THE INVENTION

One embodiment is a fluid composition containing an amount of a surfactant effective to increase the viscosity of the fluid, in which the surfactant contains a) a quaternary ammonium salt of an amine corresponding to the formula:

in which $R_1$ is a group that has from about 14 to about 26 carbon atoms and may be branched or straight chained, aromatic, saturated or unsaturated, and may include a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; one of $R_2$, $R_3$, and $R_4$ may be hydrogen; and $X^-$ is an anion; b) from about 3 to about 28 percent of an acid; and c) from about 1 to about 10 percent of a salt. The viscosity of the fluid composition decreases, as the acid content of the fluid composition decreases by reaction with an acid-reactive material to less than 2 percent, by a percentage greater at a shear rate of 1 $sec^{-1}$ than at a shear rate of from about 100 $sec^{-1}$ to about 170 $sec^{-1}$. The composition may be one in which $R_1$ contains from about 18 to about 22 carbon atoms and may contain a carbonyl, an amide, or an amine; $R_2$, $R_3$, and $R_4$ contain from 1 to about 3 carbon atoms, and $X^-$ is a halide. For example, in the composition, $R_1$ contains from about 18 to about 22 carbon atoms and may contain a carbonyl, an amide, or an amine, and $R_2$, $R_3$, and $R_4$ are the same as one another and contain from 1 to about 3 carbon atoms. The composition optionally further contains an amine that may have the structure:

in which $R_1$, $R_2$, and $R_3$ are as defined above. The amine may be present at a concentration of between about 0.01 and about 1 percent. The fluid composition may also contain a polysulfonic acid. As an example, in the surfactant, $R_1$ contains from about 18 to about 22 carbon atoms, and may contain a carbonyl, an amide, or an amine, and $R_2$, $R_3$, and $R_4$ contain from 1 to about 3 carbon atoms and may be substituted with a group that renders the $R_2$, $R_3$, and $R_4$ group more hydrophilic; a specific example of the surfactant is erucyl bis-(2-hydroxyethyl) methyl ammonium chloride (EMHAC).

The acid is selected from hydrochloric acid, a mixture of hydrochloric and hydrofluoric acids, fluoroboric acid, nitric acid, phosphoric acid, maleic acid, citric acid, acetic acid, formic acid, and mixtures of those acids. The salt is selected from lithium, sodium, ammonium, and potassium chlorides and nitrates and mixtures of those salts. The salt is present in an amount of from about 4 to about 5 weight percent. The surfactant is present in an amount of from about 1 to about 4 weight percent active material.

Another embodiment is a method of treating a subterranean formation involving contacting a formation with the fluid composition described above, comprising a surfactant, an acid, and a salt. As examples, the surfactant is EMHAC, the acid is selected from hydrochloric acid, a mixture of hydrochloric and hydrofluoric acids, fluoroboric acid, nitric acid, phosphoric acid, maleic acid, citric acid, acetic acid, formic acid, and mixtures of those acids, and the salt is selected from lithium, sodium, ammonium, and potassium chlorides and nitrates and mixtures of those salts. The salt is present in an amount of from about 4 to about 5 weight percent. The surfactant is present in an amount of from about 1 to about 4 weight percent active material.

DETAILED DESCRIPTION OF THE INVENTION

One embodiment is a self-diverting acid fluid system based on cationic surfactants. The preferred acid is HCl, but others may be used. The increase in viscosity when acid is being spent provides the self-diverting mechanism. At 100% spending the fluid undergoes a dramatic reduction in viscosity when from about 1 to about 10 percent, preferably from about 2 to about 8 percent, most preferably from about 4 to about 5 percent $NH_4Cl$ is incorporated into the system. We call this component a "break-enabling" salt. The preferred salt is $NH_4Cl$ but others may be used, for example lithium, sodium, ammonium, and potassium chlorides and nitrates and mixtures of these salts. The most pronounced reduction in viscosity is observed at low shear, which is highly desirable for cleanup of the formation. Without the added $NH_4Cl$, the fluid system can still be used as a VDA but it is not self-breaking. The system is used primarily in stimulation treatments, especially as the main treatment fluid in acid fracturing and matrix stimulation of carbonates, but it may also be used as a diverter for other acids or for fracturing, as a kill pill, or as a preflush before sandstone acidizing. It may be used with HF and is compatible with some chelating agents. It should be noted that when the fluid is used in a treatment in which it is intended to serve the role of a diverter, diversion occurs only as long as the fluid is in contact with an acid-reactive reactive material (such as a mineral) and some but not all of the acid has been consumed. Thus the proper amount of fluid and the concomitant concentrations of acid and break-enabling salt, may be calculated for the particular treatment contemplated.

The current commercial VDA technology is based on betaines, especially erucylamidopropyl betaine, a zwitterionic surfactant system. The system is highly stable upon acid spending due to its high tolerance to high salt concentrations. It does not break until it is contacted by hydrocarbons, formation water, or an added breaker. The VDA system disclosed in the present application is based on cationic surfactants; when the system includes appropriate concentrations of certain salts, such as ammonium chloride, it is a self-breaking system. If it does not contain the break-enabling salt, it can be broken in any of the same ways as the current VDA.

The acid that is part of the formulation of the fluid system of the present invention is selected from the group consisting of hydrochloric acid, hydrofluoric acid, a mixture of hydrochloric and hydrofluoric acids, fluoroboric acid, nitric acid, phosphoric acid, maleic acid, citric acid, acetic acid, formic acid, and mixtures thereof. According to a preferred embodiment of the invention, the acid is hydrochloric acid and is added at a concentration of between about 3% and about 28% by weight, most typically at a concentration of between about 15% and about 28%.

According to a preferred embodiment of the invention, the viscoelastic surfactant is added at a concentration effective to bring about thickening, that is a concentration of between about 1 and about 4%, by weight active material (the surfactant is typically delivered in solution). Most preferably, the surfactant is added at active concentration between about 2 and about 3% by weight. Higher concentrations may be used depending on the formation permeability range and contrast.

Figure 1:
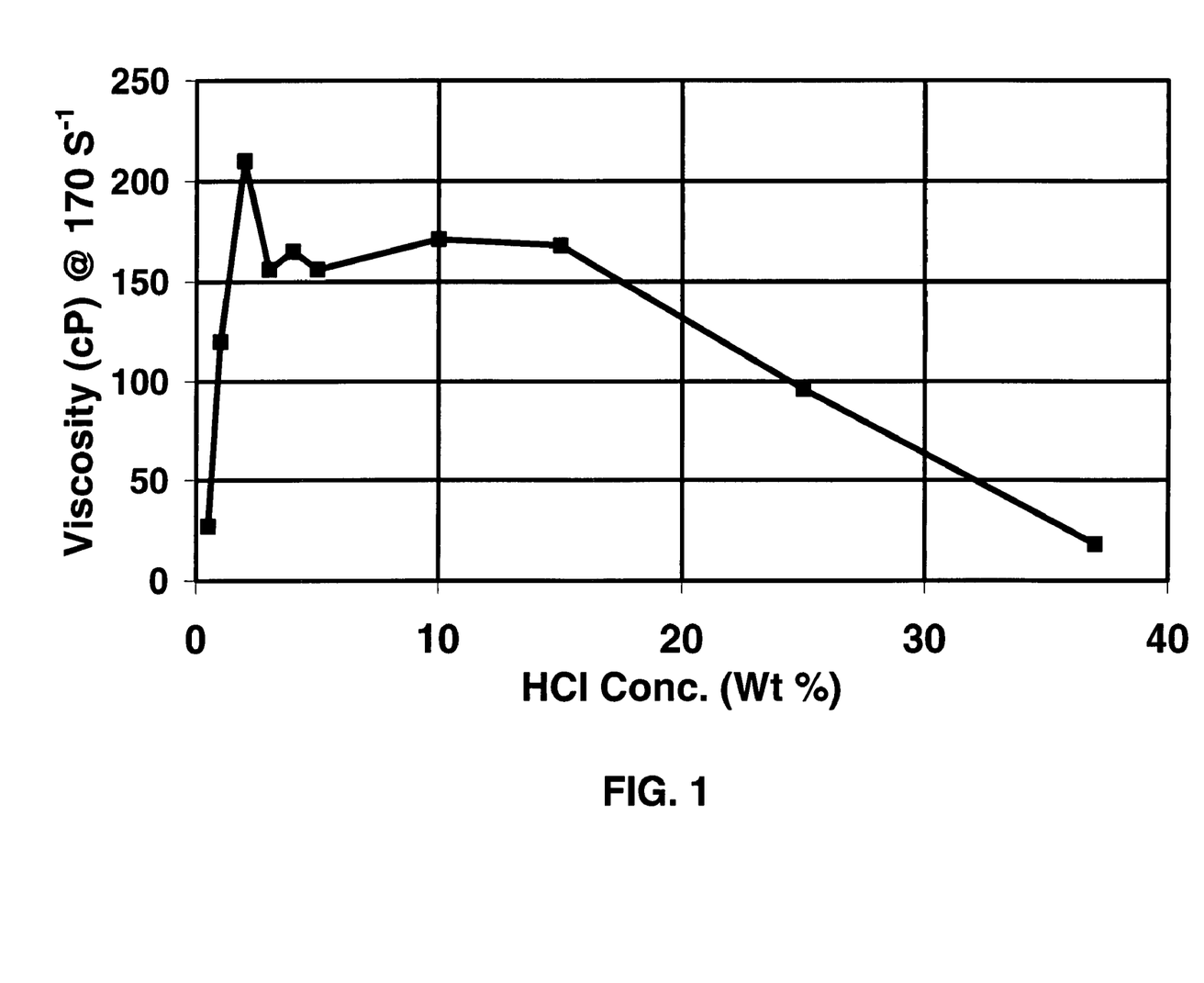
FIG. 1 shows the viscosity of 3% EMHAC as a function of HCl concentration with no added salt.

Suitable cationic surfactants form strong gels over a wide acid concentration range, as shown in FIG. 1. The behavior of the surfactant used in FIG. 1, erucyl bis-(2-hydroxyethyl) methyl ammonium chloride ("EMHAC"), also known as (Z)-13 docosenyl-N—N-bis(2-hydroxyethyl) methyl ammonium chloride, is typical of suitable cationic surfactants. EMHAC is commonly obtained from manufacturers as a concentrate, a mixture containing about 60 weight percent surfactant in a mixture of isopropanol, ethylene glycol and water. In this document, and in the Figures, when we refer to "EMHAC" we mean such a concentrate. In the Figures, when the shear rate is given as $S^{-1}$, that means $sec^{-1}$ ($seconds^{-1}$). FIG. 1 shows the viscosity of 3% EMHAC vs. HCl concentration at 70° F. (21° C.) in the absence of an added break-enabling salt.

Other examples of suitable cationic surfactants are described in U.S. Pat. Nos. 5,258,137, 5,551,516, and 5,964,295, all of which are hereby incorporated in their entirety. Although a preferred surfactant thickener is erucyl bis(2-hydroxyethyl) methyl ammonium chloride, other cationic viscoelastic surfactant thickeners may be employed, either alone or in combination, in accordance with the invention, including, but not limited to, erucyl trimethyl ammonium chloride; N-methyl-N,N-bis(2-hydroxyethyl) rapeseed ammonium chloride; oleyl methyl bis(hydroxyethyl) ammonium chloride; octadecyl methyl bis(hydroxyethyl) ammonium bromide; octadecyl tris(hydroxyethyl) ammonium bromide; octadecyl dimethyl hydroxyethyl ammonium bromide; cetyl dimethyl hydroxyethyl ammonium bromide; cetyl methyl bis(hydroxyethyl) ammonium salicylate; cetyl methyl bis(hydroxyethyl) ammonium 3,4,-dichlorobenzoate; cetyl tris(hydroxyethyl) ammonium iodide; bis(hydroxyethyl) soya amine; N-methyl, N-hydroxyethyl tallow amine; bis(hydroxyethyl) octadecyl amine; cosyl dimethyl hydroxyethyl ammonium bromide; cosyl methyl bis(hydroxyethyl) ammonium chloride; cosyl tris(hydroxyethyl) ammonium bromide; dicosyl dimethyl hydroxyethyl ammonium bromide; dicosyl methyl bis(hydroxyethyl) ammonium chloride; dicosyl tris(hydroxyethyl) ammonium bromide; hexadecyl ethyl bis(hydroxyethyl) ammonium chloride; hexadecyl isopropyl bis(hydroxyethyl) ammonium iodide; N,N-dihydroxypropyl hexadecyl amine, N-methyl, N-hydroxyethyl hexadecyl amine; N,N-dihydroxyethyl dihydroxypropyl oleyl amine; N,N-dihydroxypropyl soya amine; N,N-dihydroxypropyl tallow amine; N-butyl hexadecyl amine; N-hydroxyethyl octadecyl amine; N-hydroxyethyl cosyl amine; cetylamino, N-octadecyl pyridinium chloride; N-soya-N-ethyl morpholinium ethosulfate; methyl-1-oleyl amido ethyl-2-oleyl imidazolinium-methyl sulfate; and methyl-1-tallow amido ethyl-2-tallow imidazolinium-methyl sulfate.

Quaternary amine surfactants that would be suitable for preparation of self-diverting acidic viscoelastic cationic surfactant fluid systems include an effective amount of a surfactant that is a quaternary ammonium salt of the amine corresponding to the formula:

$R_1N^+(R_2)(R_3)(R_4) X^-$ in which $R_1$ is a group that has from about 14 to about 26 carbon atoms and may be branched or straight chained, aromatic, saturated or unsaturated, and may include a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; one of $R_2$, $R_3$, and $R_4$ may be hydrogen; and $X^-$ is an anion. Mixtures of these compounds may be used. As a further example, $R_1$ contains from about 18 to about 22 carbon atoms and may contain a carbonyl, an amide, or an amine, and $R_2$, $R_3$, and $R_4$ are the same as one another and have from 1 to about 3 carbon atoms. One such suitable surfactant, designated "Surfactant A", is used in some of the examples below.

In suitable fluids, the viscoelastic cationic quaternary amine surfactant system further may contain an amine, for example having the structure:

$R_1N(R_2)(R_3)$ in which $R_1$, $R_2$, and $R_3$ are as defined above. The amine may be present at a concentration of between about 0.01 and about 1 percent of the final fluid. $R_1$, $R_2$, and $R_3$ may be identical in the cationic surfactant and the amine. In another embodiment, the cationic surfactant system may contain a polysulfonic acid.

Quaternary amine surfactants that would be suitable include those having the same general formula as above except that one or more than one of $R_1$, $R_2$, $R_3$, and $R_4$ contains one or more ethoxy groups or one or more propoxy groups or one or more ethoxy groups and one or more propoxy groups.

A suitable cationic viscoelastic surfactant is one in which $R_1$ is a group having from about 18 to about 22 carbon atoms, that may include a carbonyl, an amide, or an amine, and in which $R_2$, $R_3$, and $R_4$ have from 1 to about 3 carbon atoms and may be substituted with a group that renders the $R_2$, $R_3$, and $R_4$ group more hydrophilic. An example of a suitable cationic viscoelastic surfactant of this structure is erucyl bis(2-hydroxyethyl) methyl ammonium chloride.

Surfactants that would be suitable include amines in which one of $R_2$, $R_3$, or $R_4$ in the compounds in the previous paragraphs is hydrogen. These amines are surfactants in strong acids due to protonation and they lose surface active properties as the acid is being spent. At some point, that may be during, at the end of, or after the spending process, depending upon the amine, they deprotonate and the micelles they have formed break. Thus such amines are inherently self-destructing and in some cases do not need the addition of salts to promote the self-destruction, although salts may be added to control the viscosity and self-destruction of the amines. It is within the scope of the invention to use the amines of the invention with or without addition of salts to promote micelle breaking.

Normally, to prepare a self-diverting acidic viscoelastic cationic surfactant fluid system in accordance with the present invention, the surfactant is added to an aqueous solution in which has been dissolved a quantity of at least one of a group of bread-enabling water soluble salts, and then the acid is added. However, the order of addition of acid, salt and surfactant is not important. Any of the components may also be premixed in a concentrate and then added to the water. Standard mixing procedures known in the art can be employed since heating of the solution and special agitation conditions are normally not necessary. Of course, if used under conditions of extreme cold such as found in Alaska or Canada, normal heating procedures should be employed Sometimes it is preferable to dissolve the thickener into a lower molecular weight alcohol or diol prior to mixing it with the aqueous solution. The lower molecular weight alcohol or diol, for instance isopropanol or propylene glycol, may function to aid to solubilize the thickener. Other similar agents may also be employed. Further, a defoaming agent such as a polyglycol may be employed to prevent undesirable foaming during the preparation of the VDA fluid if a foam is not desirable under the conditions of the treatment. If a foamed fluid is desired, a gas such as air, nitrogen, carbon dioxide or the like may be employed. An additional foamer is not normally required, but may be added. Furthermore, rheology modifiers and rheology enhancers, such as polymers and others known in the art, may be included. As is typically the case, additives should be tested to ensure that they are compatible with the other components of the fluid and to ensure that they do not deleteriously affect the performance the fluid.

Similarly, a sufficient quantity of a water soluble organic salt and/or alcohol may optionally be employed to provide desired viscoelastic properties under severe conditions. Again, these should be tested; many compounds commonly used for such purposes would not be suitable for the present invention, because many such compounds form insoluble precipitates with calcium (for example salicylates under certain conditions) and others are breakers for many viscoelastic surfactant micelles (for example, $C_1$ to $C_{12}$ alcohols under certain conditions). However, it is within the scope of the invention to incorporate into the fluids of the invention co-surfactants or other additives (such as but not limited to $C_1$ to $C_3$ alcohols) that alter the properties of the viscoelastic fluids, provided that the additives are tested for compatibility before use.

The fluid of the invention can be pumped as a single fluid, which stimulates and diverts in one step. It can be bullheaded down tubing or, according to a preferred embodiment, placed using coiled tubing moved up while injecting the acidic formulation. According to another embodiment, the fluid is pumped in several stages, alternately with regular acid stages. The fluid may also be foamed. As is typically the case for acid treatments, the formulation normally comprises corrosion inhibitors, most preferably based on quaternary amines. Further agents may also be typically added; nonlimiting examples are non-emulsifiers, fluid loss additives, iron reducing or control agents, and chelating agents. As usual, when additives are included in the fluid system, laboratory testing should be conducted to ensure compatibility so that neither the fluid nor the additive interferes with the stability or efficacy of the other. If the fluid is used in fracturing or gravel packing, proppant or gravel may be suspended in the fluid.

The system is used primarily in stimulation treatments, especially acid fracturing and matrix stimulation of carbonates, but it may also be used as a diverter for other acids or for fracturing or gravel packing; as a kill pill; as a base fluid for cleanout treatments, especially with coiled tubing; and as a preflush before sandstone acidizing. It may be used with HF and is compatible with some chelating agents. Without the added $NH_4Cl$ or other break-enabling salt, the fluid system can still be used as a self-diverting acid, but it is not self-breaking.

EXAMPLE 1

Figure 2:
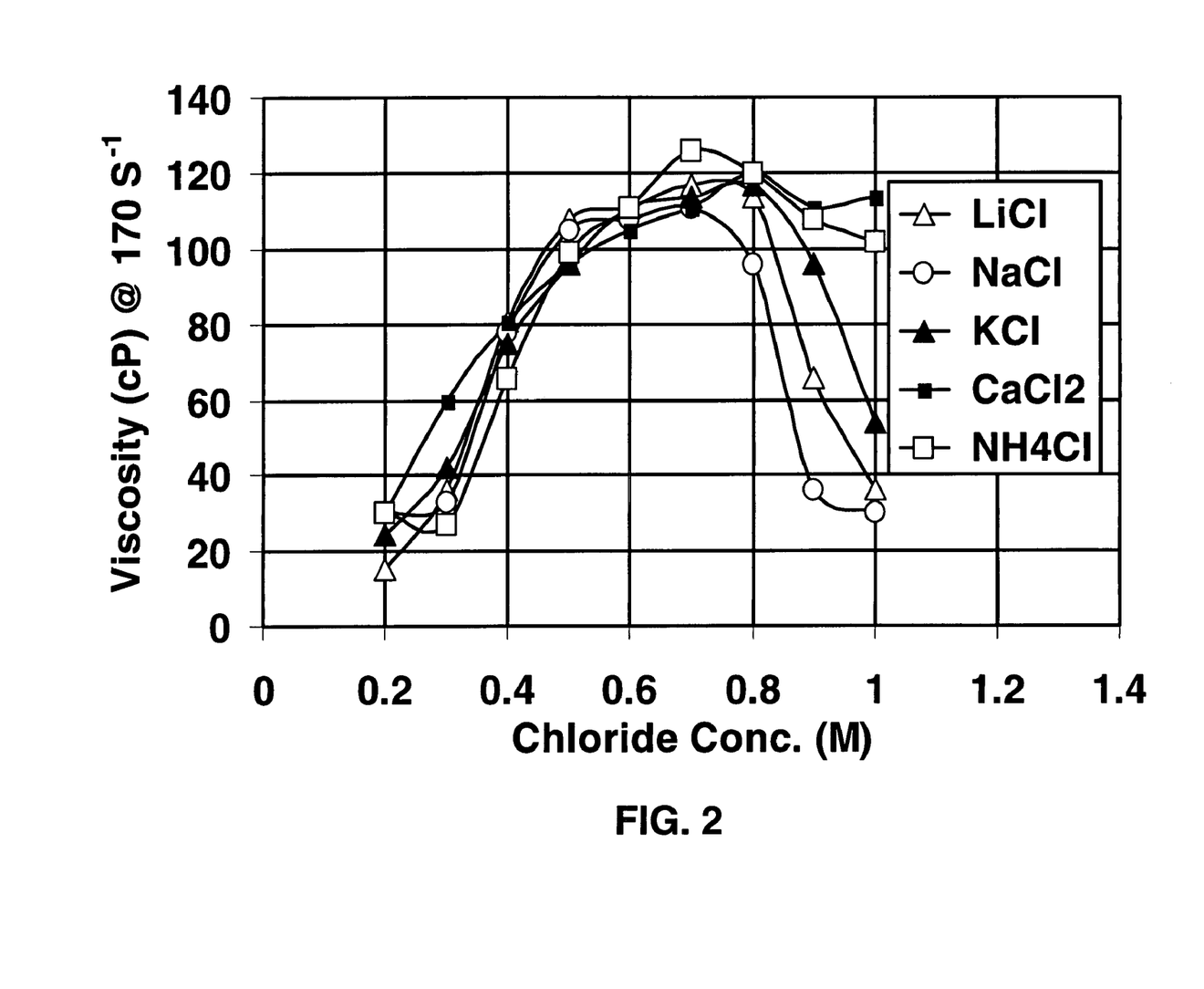
FIG. 2 shows the viscosity of 3% EMHAC as a function of molar concentration of chloride.

The rheology under acidic conditions is similar to that of fluids made with the current VDA technology based on erucylamidopropyl betaine, except that the rheological behavior of 3% EMHAC (no added acid) in various brines (FIG. 2) shows the intolerance of typical cationic surfactants of the invention to high concentrations of brine (having anions such as $Cl^-$, and $NO_3^-$). Not to be limited by theory, but for most surfactants and most salts, there is a salt concentration above which the viscosity of a given viscoelastic fluid system decreases dramatically. The data in the figure show that EMHAC is particularly stable in $NH_4Cl$ and $CaCl_2$; although it is not shown on the figure, it is believed that at higher salt concentrations the viscosity would drop with these salts as well. Furthermore, it is believed that addition of $NH_4Cl$ shifts the curve for $CaCl_2$ to the right; and that this would also be so for other salts such as, but not limited to $Li^+$, $Na^+$, and $K^+$ chlorides. Thus these salts are called break-enabling because, when the appropriate amount of such a salt is added to the system, the concentration of this salt plus the $CaCl_2$ generated by the spending of the acid becomes high enough to break the micelle system. This rheological behavior of EMHAC and other cationic surfactants of the invention (as opposed to zwitterionic surfactants) in acids and brines is responsible for the self-diverting acid system having the self-breaking feature. Simple laboratory testing can be used to determine which salts work in a given system and at what concentration.

EXAMPLE 2

Figure 3:
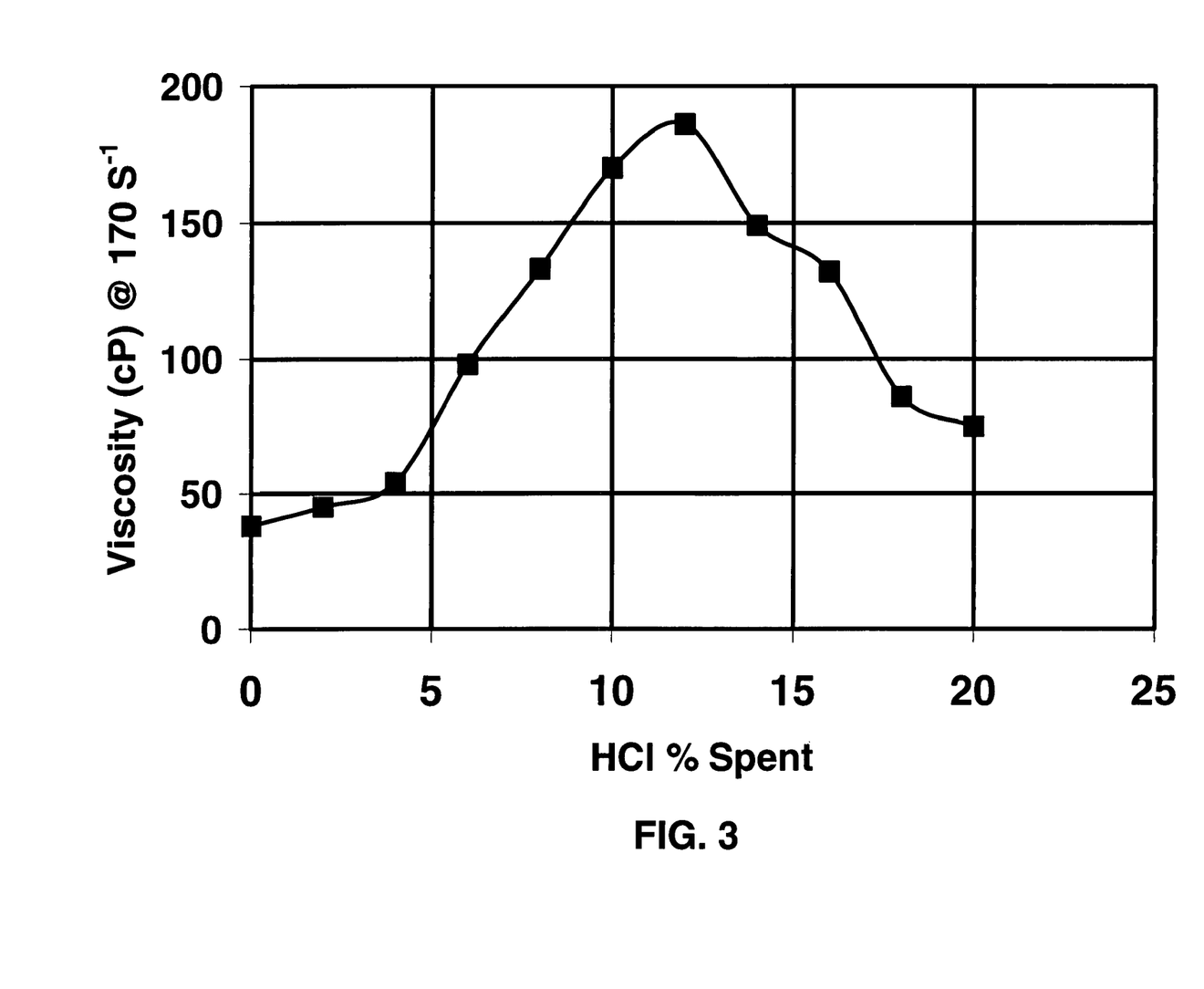
FIG. 3 shows the viscosity of 3% EMHAC as a function of percentage HCl being spent (with $CaCl_2$ added to simulate HCl spending).
Figure 4:
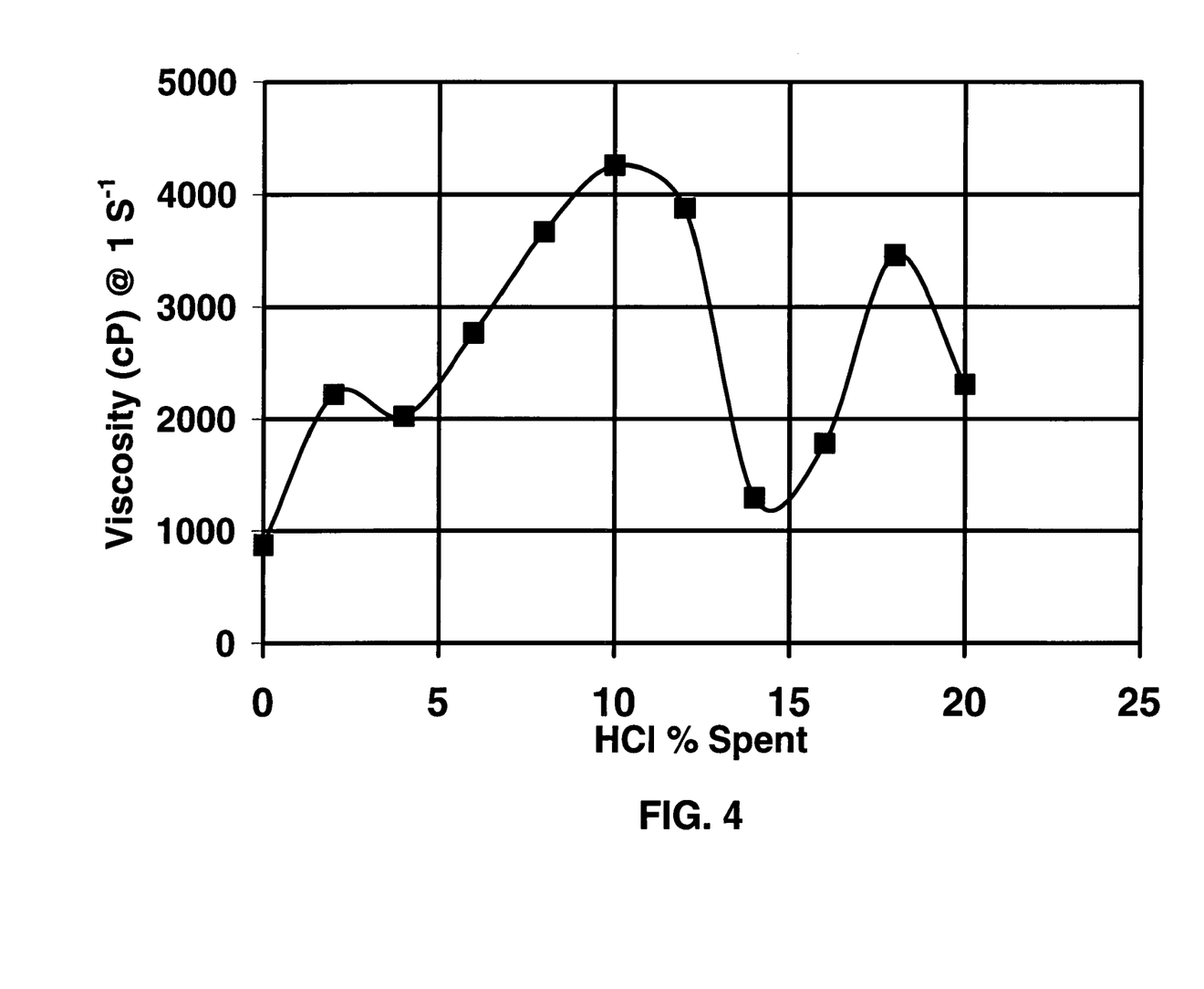
FIG. 4 shows the spending curve of 3% EMHAC at low shear rate (1 $sec^{-1}$) with $CaCl_2$ added to simulate HCl spending.

FIG. 3 shows a plot of viscosity as a function of % HCl being spent, (as simulated by making mixtures of HCl and $CaCl_2$) at a shear rate of from about 100 $sec^{-1}$ to about 170 $sec^{-1}$. The starting fluid (0% HCl spent) contains 3% EMHAC, 20% HCl and 0.2% of a corrosion inhibitor based on quaternary amines and formic acid; for the other data points, some of the HCl was replaced by the appropriate molar concentration of $CaCl_2$. Note that this system does not contain any additional salt, such as $NH_4Cl$. The data indicate that this specific fluid undergoes a rapid viscosity increase while up to 12% HCl is being spent. Further reduction of the HCl concentration results in a continuous decrease in the fluid viscosity. However, the spending curve at a lower shear rate (1 $sec^{-1}$), as shown in FIG. 4, indicates that the 100% spent fluid still remains viscous. Since low shear viscosity is critical to formation cleanup, it is highly desirable that the low shear viscosity of 100% spent fluid be further reduced. This fluid is not be considered self-breaking, because it is stable at the low shear that it experiences in a formation after a job and thus it resists cleanup.

EXAMPLE 3

Figure 5:
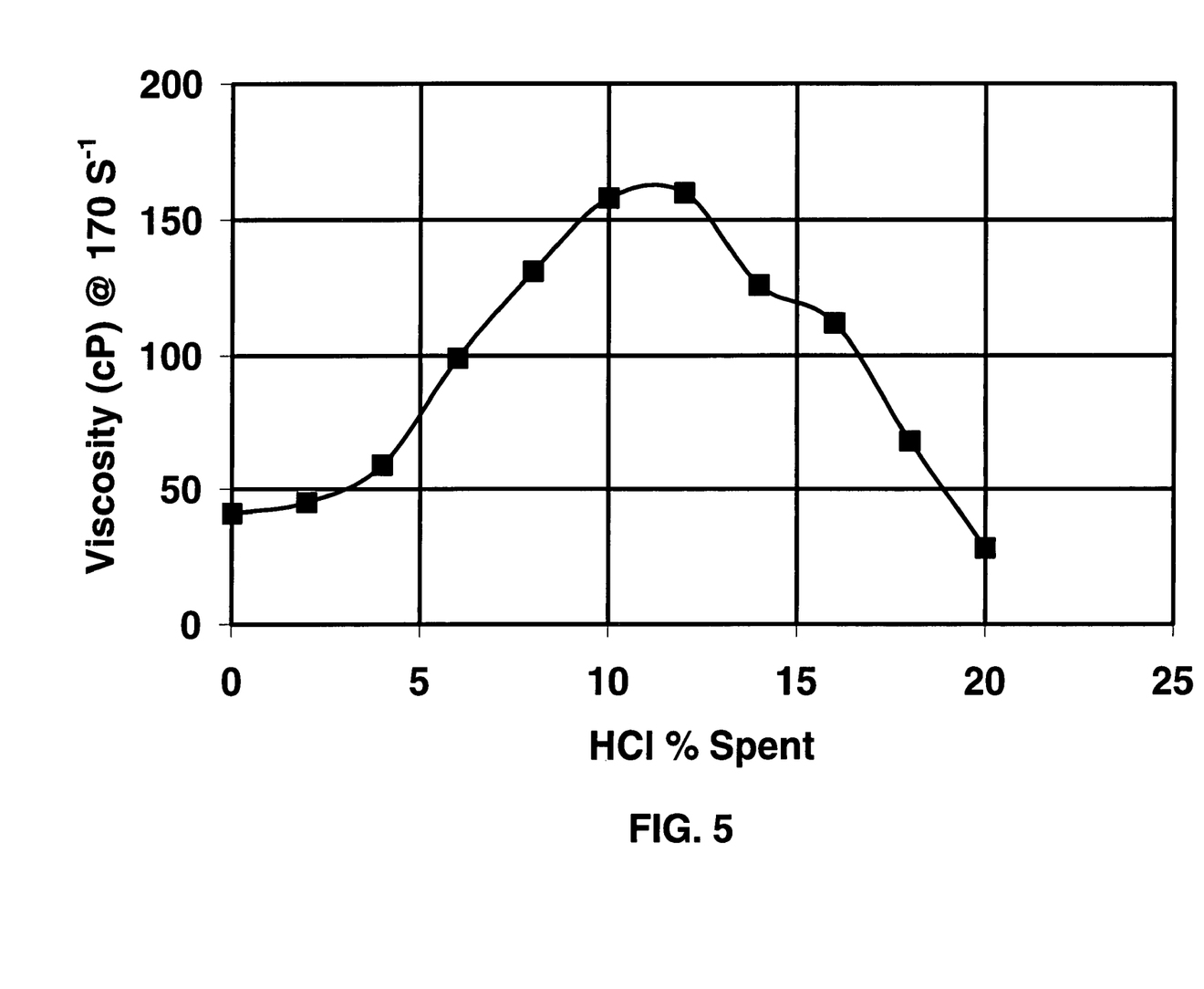
FIG. 5 shows the viscosity as a function of % HCl spent with 5% $NH_4Cl$ (in addition to the $CaCl_2$ added to simulate acid spending).
Figure 6:
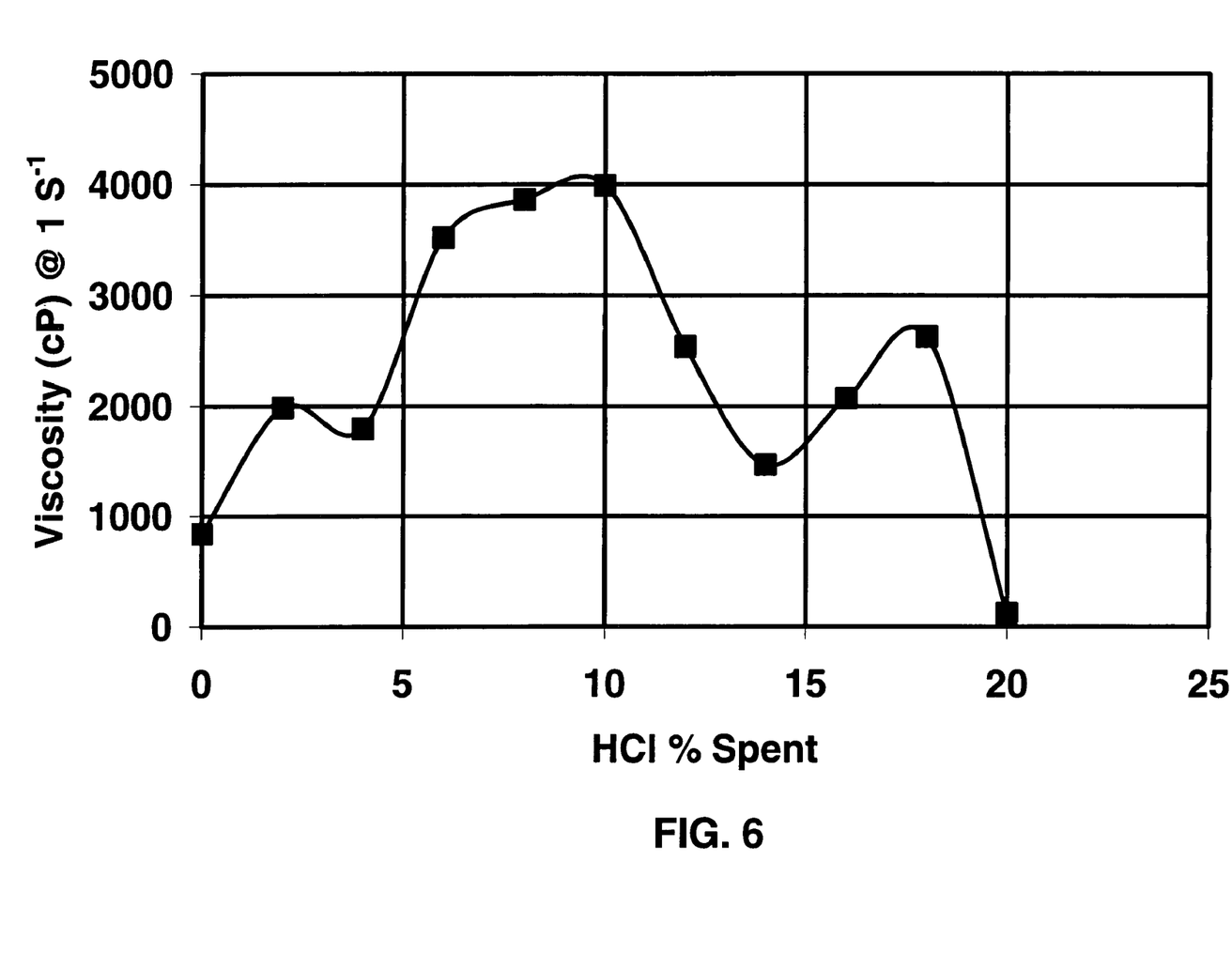
FIG. 6 shows the spending curve with 5% $NH_4Cl$ (in addition to the $CaCl_2$ added to simulate acid spending) at low shear rate (1 $sec^{-1}$).

To achieve the reduction of low shear viscosity, additional salts (break-enabling salts), such as $NH_4Cl$, were introduced into the fluid system. It is believed that other salts such as KCl, NaCl, and LiCl, or salts containing $NO_3^-$ will work the same way in this system; simple experiments may be used to determine the appropriate concentrations. FIG. 5 shows the viscosity at 170 $sec^{-1}$ of the fluid as a function of the HCl % spent, starting with 3% EMHAC, 20% HCl, 0.2% of a corrosion inhibitor based on quaternary amines and formic acid, and 5% $NH_4Cl$ as the break-enabling salt. In this case, a further reduction of viscosity at 170 $sec^{-1}$ was observed as the last of the HCl was spent. Compare FIGS. 3 and 5; the curves are nearly identical with and without the added 5% $NH_4Cl$ except as the last of the HCl is spent, in which case the fluid system containing the $NH_4Cl$ had a viscosity at 170 $sec^{-1}$ of less than 30 cP instead of about 75 cP. Most importantly, the viscosity reduction of the 100% spent fluid was more pronounced at low shear rate when the fluid system (3% EMHAC, 20% HCl, 0.2% of a corrosion inhibitor based on quaternary amines and formic acid) contained 5% $NH_4Cl$, as shown in FIG. 6. Compare FIGS. 4 and 6; the curves are very similar with and without the added 5% $NH_4Cl$ (and all the viscosities at less than complete acid spending are high enough that the exact values do not matter and the systems are both useful as thickeners) except as the last of the HCl is spent, in which case the fluid system containing the $NH_4Cl$ had a viscosity at 1 $sec^{-1}$ of about 125 cP instead about 2300 cP.

EXAMPLE 4

Figure 7:
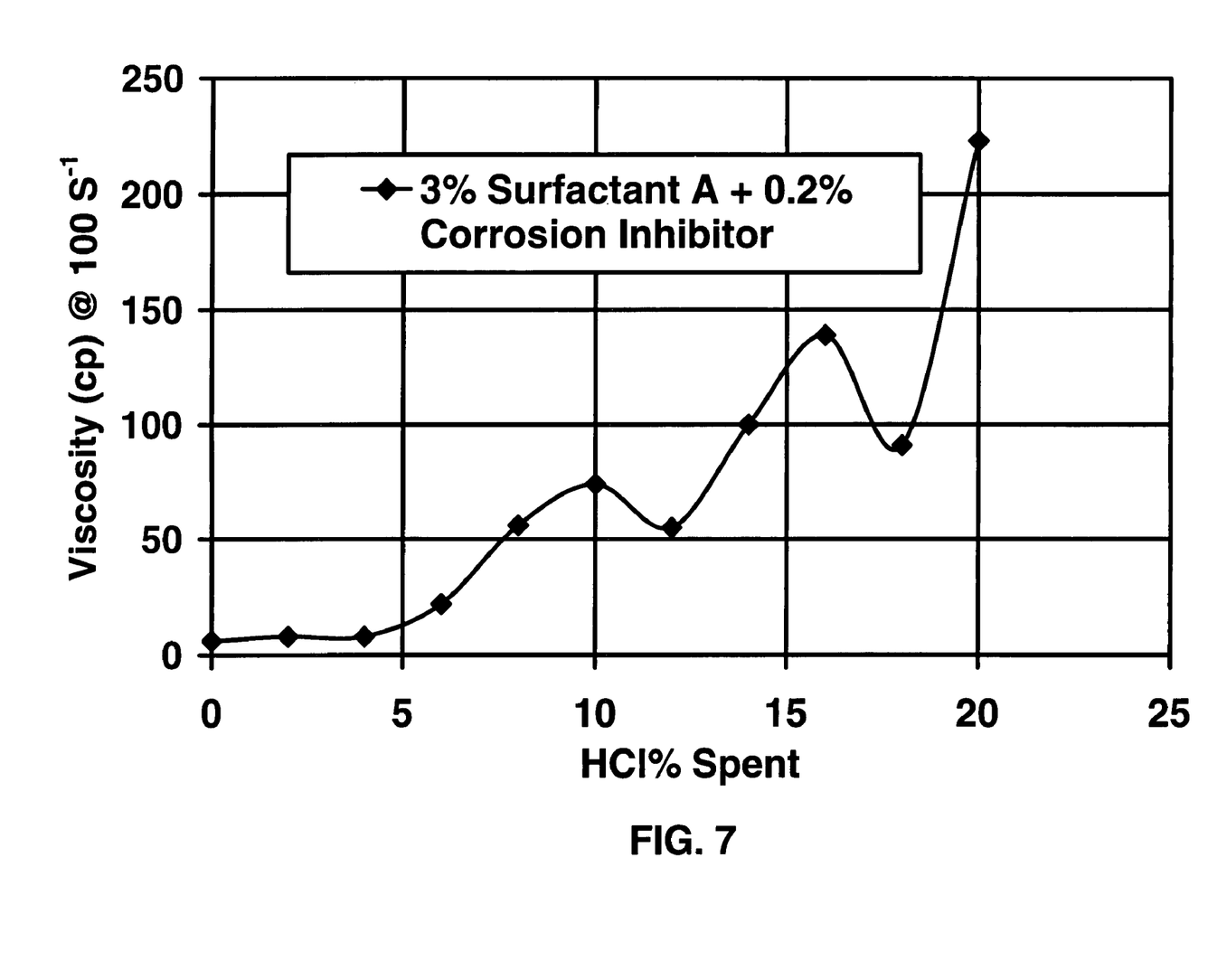
FIG. 7 shows simulated HCl spending tests of Surfactant A without $NH_4Cl$ at a shear rate of 100 $sec^{-1}$.
Figure 8:
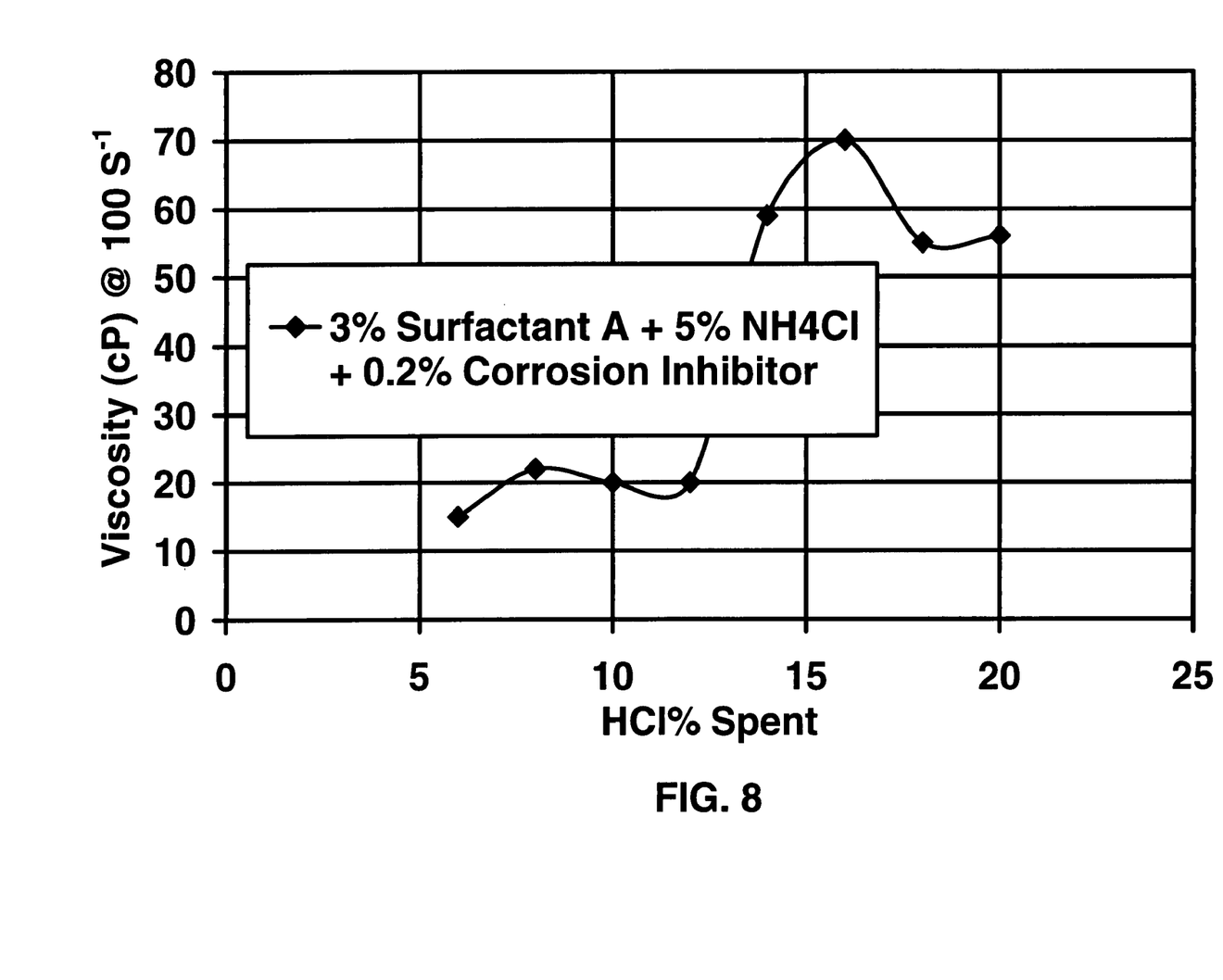
FIG. 8 shows simulated HCl spending tests of Surfactant A with 5% $NH_4Cl$ at a shear rate of 100 $sec^{-1}$.

Results with another example of a suitable cationic surfactant ("Surfactant A") are shown in FIGS. 7-10. This surfactant is a erucyl-based quaternary amine in which at least one of the groups on the amine contains at least an ethoxy group. FIG. 7 shows the fluid system viscosity (3% by weight of the surfactant concentrate, various amounts of HCl and $CaCl_2$ added to simulate the components that would be left after a given amount of HCl had been spent, and 0.2% of the same corrosion inhibitor used in the earlier examples) at 100 $sec^{-1}$ in simulated HCl spending tests without added $NH_4Cl$. FIG. 8 shows the same system and experiments except that the fluid systems also contained 5% $NH_4Cl$. It can be seen that at this shear rate the added $NH_4Cl$ lowered the viscosity of this system at all HCl spending levels, but the viscosity was still significant (above 50 cP) after all the HCl had been spent.

Figure 9:
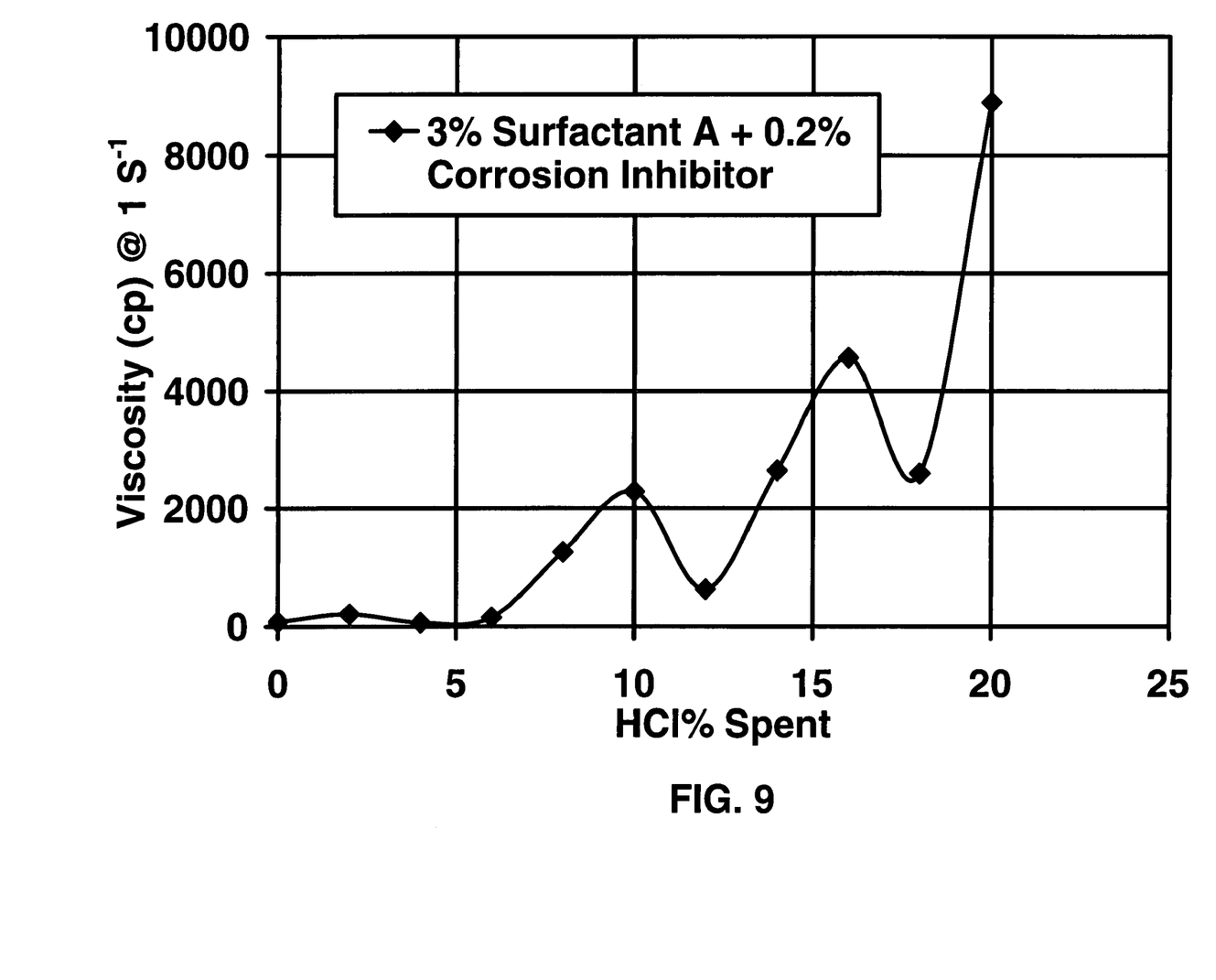
FIG. 9 shows simulated HCl spending tests of Surfactant A without $NH_4Cl$ at a shear rate of 1 $sec^{-1}$.
Figure 10:
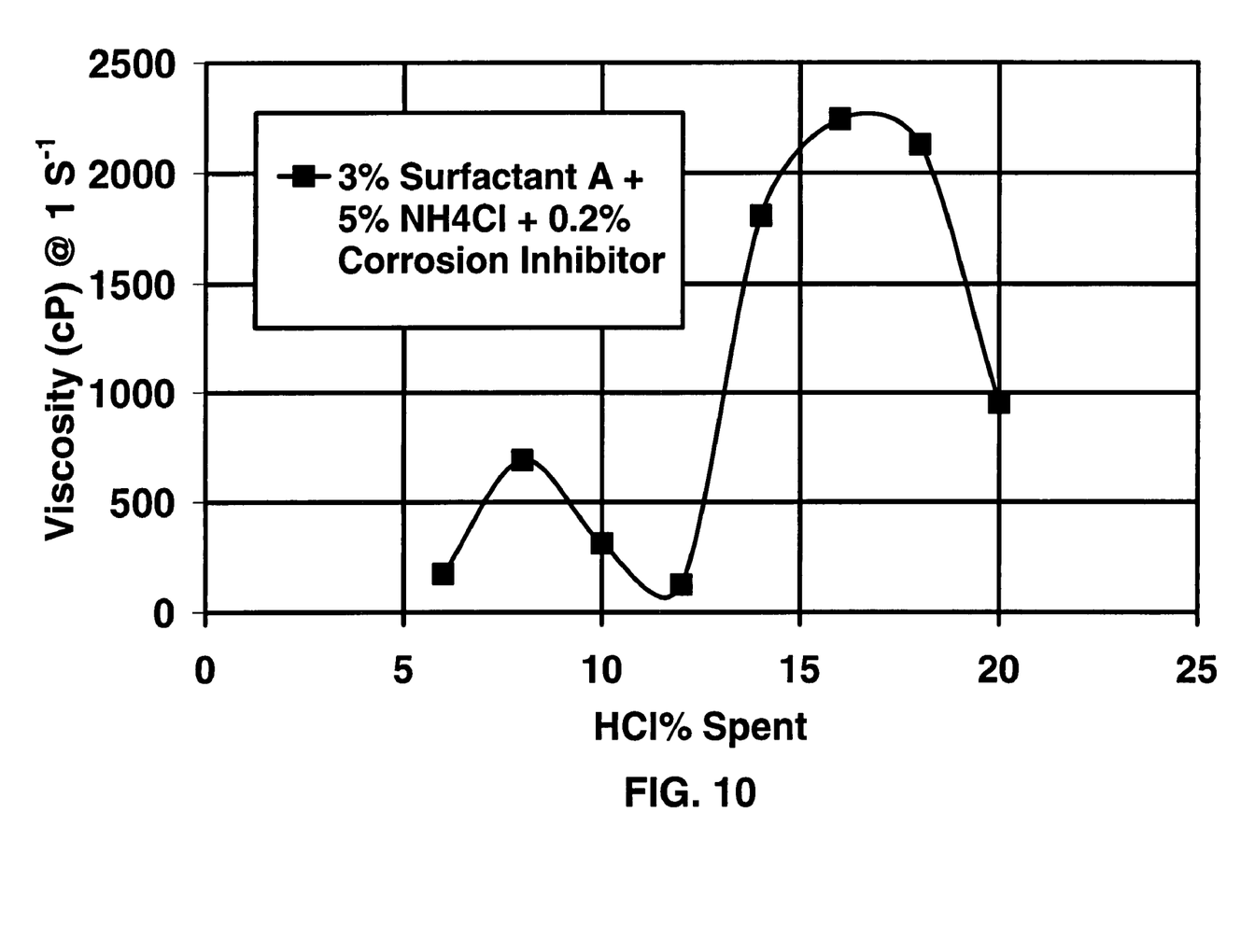
FIG. 10 shows simulated HCl spending tests of Surfactant A with 5% $NH_4Cl$ at a shear rate of 1 $sec^{-1}$.

FIGS. 9 and 10 show the results of the same experiments with the same two chemical systems except that the data are for measurements at a shear rate of 1 $sec^{-1}$. The data show that at this shear rate, too, the added $NH_4Cl$ lowered the viscosity of this system at all HCl spending levels, but that the viscosity was still significant (above 50 cP) after all the HCl had been spent. However, again, the added $NH_4Cl$ caused the low shear viscosity to drop substantially when the last of the HCl was spent (FIG. 10) as opposed to increasing substantially (FIG. 9) without the added $NH_4Cl$. It is believed that at higher temperatures the low shear viscosity of the system containing added $NH_4Cl$ would demonstrate self-breaking properties for the system and that with an adjustment of the concentration or nature of the added salt, this property would be observed at lower temperatures as well.

We claim:

1. A method of treating a subterranean formation selected from the group consisting of matrix acidizing, acid fracturing or diverting comprising contacting said formation with an acid viscoelastic fluid composition that self breaks in the formation, comprising from about 1 weight percent to about 4 weight percent of a surfactant effective to increase the viscosity of the fluid,
   a. from about 3 to about 28 percent of an acid selected from the group consisting of hydrochloric acid, a mixture of hydrochloric acid and fluoroboric acid, fluoroboric acid, nitric acid, phosphoric acid, maleic acid, formic acid, and mixtures thereof,
   b. from about 1 to about 10 percent of a salt, wherein the salt is selected from the group consisting of lithium, sodium, ammonium, and potassium chlorides and nitrates and mixtures thereof, wherein the viscosity of the fluid composition decreases, as the acid content of the fluid composition decreases by reaction with an acid-reactive material to less than 2 percent, by a percentage greater at a shear rate of 1 $sec^{-1}$ than at a shear rate of about 100 $sec^{-1}$ to about 170 $sec^{-1}$, wherein the surfactant is erucyl bis-(2-hydroxyethyl) methyl ammonium chloride.

2. The method of claim 1 wherein the acid is hydrochloric acid.

3. The method of claim 1 wherein the salt is ammonium chloride.

4. The method of claim 1 wherein the salt is present in an amount of from about 4 to about 5 weight percent.

5. The method of claim 1 wherein the method of treatment is a method of matrix acidizing.

6. The method of claim 1 wherein the method of treatment is a method of acid fracturing.

* * * * *